United States Patent [19]
Dold

[11] Patent Number: 5,905,316
[45] Date of Patent: May 18, 1999

[54] STRUCTURED CABLING

[76] Inventor: Roland Dold, Katzensteig 34, D-78120 Furtwangen, Germany

[21] Appl. No.: 08/939,629
[22] Filed: Sep. 29, 1997

[30] Foreign Application Priority Data

Oct. 2, 1996 [DE] Germany ............. 296 17 178 U

[51] Int. Cl.$^6$ ............... H01B 7/30; H01R 29/00
[52] U.S. Cl. ................................. 307/147; 439/189
[58] Field of Search .............. 439/49, 189; 307/147

[56] References Cited

U.S. PATENT DOCUMENTS

| 4,968,929 | 11/1990 | Hauck et al. | 324/66 |
| 5,078,624 | 1/1992 | Burroughs et al. | 439/668 |
| 5,366,388 | 11/1994 | Freeman et al. | 439/540 |

Primary Examiner—Jeffrey Gaffin
Assistant Examiner—Jonathan Kaplan
Attorney, Agent, or Firm—Eugene E. Renz, Jr., PC

[57] ABSTRACT

A structured cabling system with at least one pair of 2n-pole distribution sockets, with at least one pair of 2n-pole outlets, and with installed n-wire cable connections, each of which connects n poles of a distribution socket to n poles of the associated outlet. The system comprises means connecting the n unoccupied poles of one distribution socket (10.1) to the unoccupied poles of the second distribution socket (10.2) for at least one pair of distribution sockets (10.1, 10.2). The system further includes means connecting the n unoccupied poles of one outlet (14.1) to the unoccupied poles of the second outlet (14.2) for at least the associated pair of outlets; and in that, in one distribution socket (10.2) and in one outlet (14.2) of each pair, each of the n unoccupied poles can be connected to one of the n occupied poles by means of a short-circuiting bridge plug (16).

5 Claims, 2 Drawing Sheets 5,905,316

STRUCTURED CABLING

FIELD OF THE INVENTION

The present invention relates to a so-called structured cabling system and more specifically to an improved system combining cable connections of associated plural sockets and outlets to form a single outlet wherein all contact poles are occupied in cable wires.

BACKGROUND OF THE INVENTION

In commercial buildings, structured cablings are being installed to an increasing extent, i.e., cablings which head out in a star-like pattern from a central distribution panel to outlets distributed throughout the building or one floor of the building. These structured cablings are designed for telecommunications and data networks, etc. Each socket on the distribution panel is connected by the cabling to a plug-in outlet. The individual outlets can be connected and reconnected individually to the distribution panel.

The distribution sockets on the distribution panel and the plug-in outlets for the terminal devices connected by the cabling are usually standard sockets with a predetermined number of contact poles. In many cases, sockets with eight contacts are used, e.g., RJ45 sockets. The structured cabling is often designed so that not all the contacts of the sockets are assigned. For example, ISDN and Ethernet networks are designed for only 4 wires, so that of the 8 contacts in the sockets, only 4 are occupied by wires of the structured cabling. If a 4-wire structured cabling of this type is to be used for 8-wire services, it is necessary to change the wiring of the distribution sockets and outlets and to connect the wires of two sockets in each case to the contact poles of a single socket. This means that installation will be expensive.

SUMMARY OF THE INVENTION

With the foregoing in mind, this invention is based on the task of creating a structured cabling which has 2n-pole sockets and n-wire cabling connections but which can also be used as 2n-wire cabling without any extra installation work. The basic idea of the invention consists in combining the wires of the cable connections of two distribution sockets and of the two associated outlets and thus to formal single distribution socket and a single outlet, in which all the contact poles will thus be occupied by cable wires. If, for example, a structured cabling is laid out in such a way that all of the 8-pole sockets are connected by 4-wire cables, then the 4-wire cable connections leading form two of these sockets are combined and connected to one of the 8-pole sockets, so that the existing structured cabling can be used for 8-wire services.

The essential point is that a switch can be made between the use of the system as two sets of 4-wire cablings and its use as a single 8-wire cabling without the need to change the wiring of the distribution panel or the wiring of the outlets. The change between the two types of usage can be accomplished simply by inserting a plug, without the need for complicated modifications to the installation.

In a preferred embodiment, the poles of each pair of distribution sockets left unoccupied when the cabling is used as a 4-wire system are connected to each other as are the unoccupied poles of each associated pair of outlets. If then, a short-circuiting bridge plug, which connects the unoccupied poles to the occupied poles, is then inserted into one of the two sockets of the pair, the 4-wire cable connection of the one socket of the pair is connected to the unoccupied poles of the second socket of the pair. By pulling out the short-circuiting bridge plug, the two sockets of the pair in question can be converted back to 4-wire service. Connecting the unoccupied poles of the two sockets of the pair to each other does not impair the use of the cabling as a 4-wire system, because these contact poles are not used in this type of application.

This embodiment offers the advantage that the only work which must be done to change back and forth between a system with two sets of 4-wire cablings and a system with one set of 8-wire cabling is to insert or remove a short-circuiting bridge plug into one of the distribution sockets and another into one of the outlets. The free poles of the two sockets of each pair, however, must have been already connected to each other when the cabling was installed. Later conversion of the structured cabling to the double usage possibility according to the invention requires modifications to the wiring of the distribution panel and of the outlets.

In a second embodiment, adapters are provided for the distribution panel and for the outlets. These adapters are inserted into pairs of distribution sockets and correspondingly into the associated pairs of outlets to combine the occupied contact poles of the two sockets of the pair into a common socket, in which all poles of the socket are occupied.

Here too it is possible to insert or remove the adapters as needed to change between a system with two sets of 4-wire cablings and a system with a single set of 8-wire cabling.

The use of adapters is somewhat more expensive and under certain conditions can be esthetically unattractive. In this embodiment, the possibility of changing between the two different systems does not have to be provided at the time the distribution panel and the outlets are first installed. Even if no provision for the possibility of alternative uses was made at the time the structured cabling was installed, the possibility according to the invention of changing from one type of system to another can still be implemented without the need for modifications to the wiring of the distribution panel or of the outlets.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENTS

Figure 1:
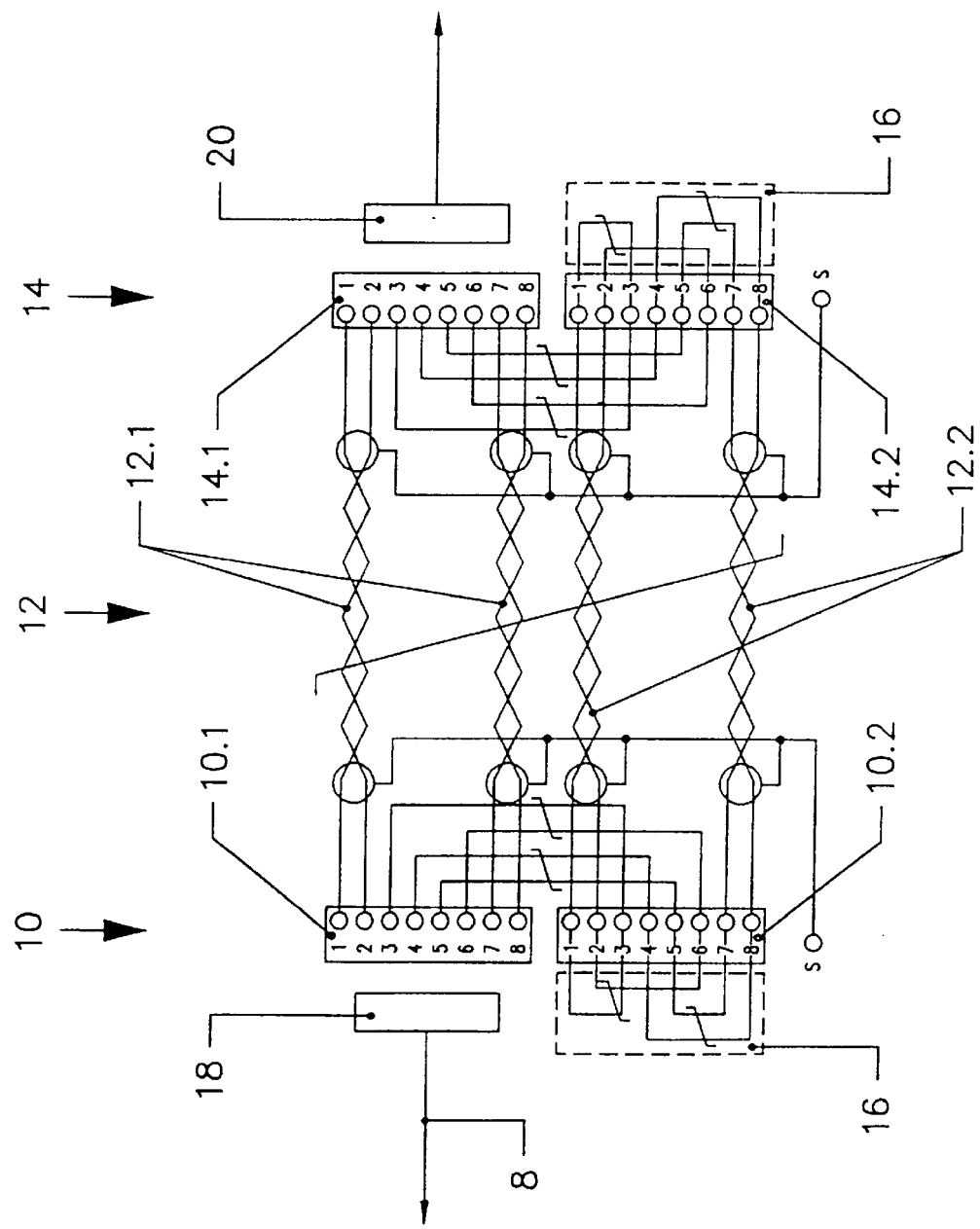
FIG. 1 shows a circuit diagram of a first embodiment of the structured cabling.

Referring now to the drawings and particularly FIG. 1 thereof, there is shown a structured cabling system in accordance with the present invention. The structured cabling system is laid out in a building and consists of a centrally located distribution panel 10, which is connected by cabling 12 to outlets 14, distributed throughout the building. Distribution panel 10 has a plurality of distribution sockets. Only two distribution sockets 10.1, 10.2 are shown in the drawing for explanatory purposes. The number of outlets 14 is the same as that of distribution sockets on distribution panel 10. Accordingly, only two outlets 14.1, 14.2 are shown in the drawing for explanatory purposes. Distribution sockets 10.1, 10.2 and outlets 14.1, 14.2 are 8-pole sockets of the RJ45 type. Cabling 12, which connects distribution panel 10 to outlets 14, consists of 4-wire cable connections, each of which connects one distribution socket on distribution panel 10 to an associated outlet 14. Accordingly, the drawing shows only two cable connections 12.1, 12.2 which connect distribution sockets 10.1 and 102 to outlets 14.1 and 14.2. In the illustrated exemplary embodiment, contact poles 1, 2, 7 and 8 of distribution sockets 10.1, and 10.2 are connected to the corresponding contact poles 1, 2, 7 and 8 of associated outlets 14.1 and 14.2. Contact poles 3, 4, 5 and 6 of distribution sockets 10.1 and 10.2 and of outlets 14.1 and 14.2 are note occupied by cable connections 12.1 and 12.2. Cable connections 12.1 and 12.2 consist in each case of two pairs of two twisted wires, which are provided with shielding S, so that high bit rates can be transmitted.

The distribution sockets are connected inside distribution panel 10, to each other in pairs as shown in the drawing for distribution sockets 10.1, 10.2 in such a way that the unoccupied contact poles 3, 4, 5 and 6 of one distribution socket 10.1 are wired to the corresponding contact poles 3, 4, 5 and 6 of one distribution socket 10.1 are wired to the corresponding contact poles 3, 4, 5 and 6 of the other distribution socket 10.2. In a corresponding manner, outlets 14 are also connected internally to each other in pairs, as shown in the drawings for outlets 14.1 and 14.2. Here also poles 3, 4, 5 and 6 of outlet 14.1 unoccupied by cable connections 12.1 and 12.2 are connected to the corresponding contact poles 3, 4, 5 and 6 of outlet 14.2.

If the structured cabling shown in FIG. 1 is being used as a 4-wire system, e.g., for an ISDN or Ethernet network, then a feed cable with an RJ45 plug can be inserted into each of distribution sockets 10.1 and 10.2 and a terminal device can be connected by means of an RJ45 plug to the associated outlet 14.1 and 14.2. The connection of the unoccupied poles 3, 4, 5 and 6 of distribution sockets 10.1 and 10.2 and of outlets 14.1 and 14.2 has no effect whatever, because the corresponding poles of the plugs are not occupied either. In contrast to the exemplary embodiment shown in the drawing, the connections in the case of the ISDN network are different; that is, poles 3, 4, 5 and 6 of the plugs are occupied, whereas poles 1, 2, 7 and 8 are free. In this case, therefore, unoccupied poles 1, 2, 7 and 8 of the pairs of sockets would be connected to each other.

To use the structured cabling according to FIG. 1 for 8-wire service, the 4-wire cable connections 12.1 and 12.2 between the two distribution sockets 10.1 and 10.2 and the two outlets 14.1 and 14.2 are combined. For this purpose, short-circuiting bridge plugs 16 are inserted into one of the distribution sockets 10.2 and into one of the outlets 14.2. Short-circuiting bridge plugs 16 have the same design as that of the sockets, e.g., as RJ45 plugs. In short-circuiting bridge plugs 16, one of the occupied poles is short-circuited with one of the unoccupied poles. In the exemplary embodiment shown, pole 1, for example, is connected to pole 3, pole 2 to pole 6, pole 7 to pole 5, and pole 8 to pole 4. In this way, cable connections 12.2 of distribution socket 10.2 are connected by way of short-circuiting bridge plug 6 to poles 3, 4, 5 and 6 of distribution socket 10. 1, and the four wires of cable connection 12.2 are connected similarly by way of short-circuiting bridge plug 16 inserted in outlet 14.2 to poles 3, 4, 5 and 6 of outlet 14.1. All 8 poles of distribution socket 10.1 are thus connected by way of cable connections 12.1 and 12.2 to the 8 poles of outlet 14.1. A plug 18 of an 8-wire service with all 8 poles assigned can be plugged into distribution socket 10.1, and plug 20 of a terminal device, with all 8 poles assigned, can be plugged into outlet 14. 1.

Simply by inserting short-circuiting bridge plug 16, therefore, two sets of 4-wire cabling are converted into a single set of 8-wire cabling. Conversely, by pulling short-circuiting bridge plug 16 out, the system can be changed back to two sets of 4-wire cabling.

Figure 2:
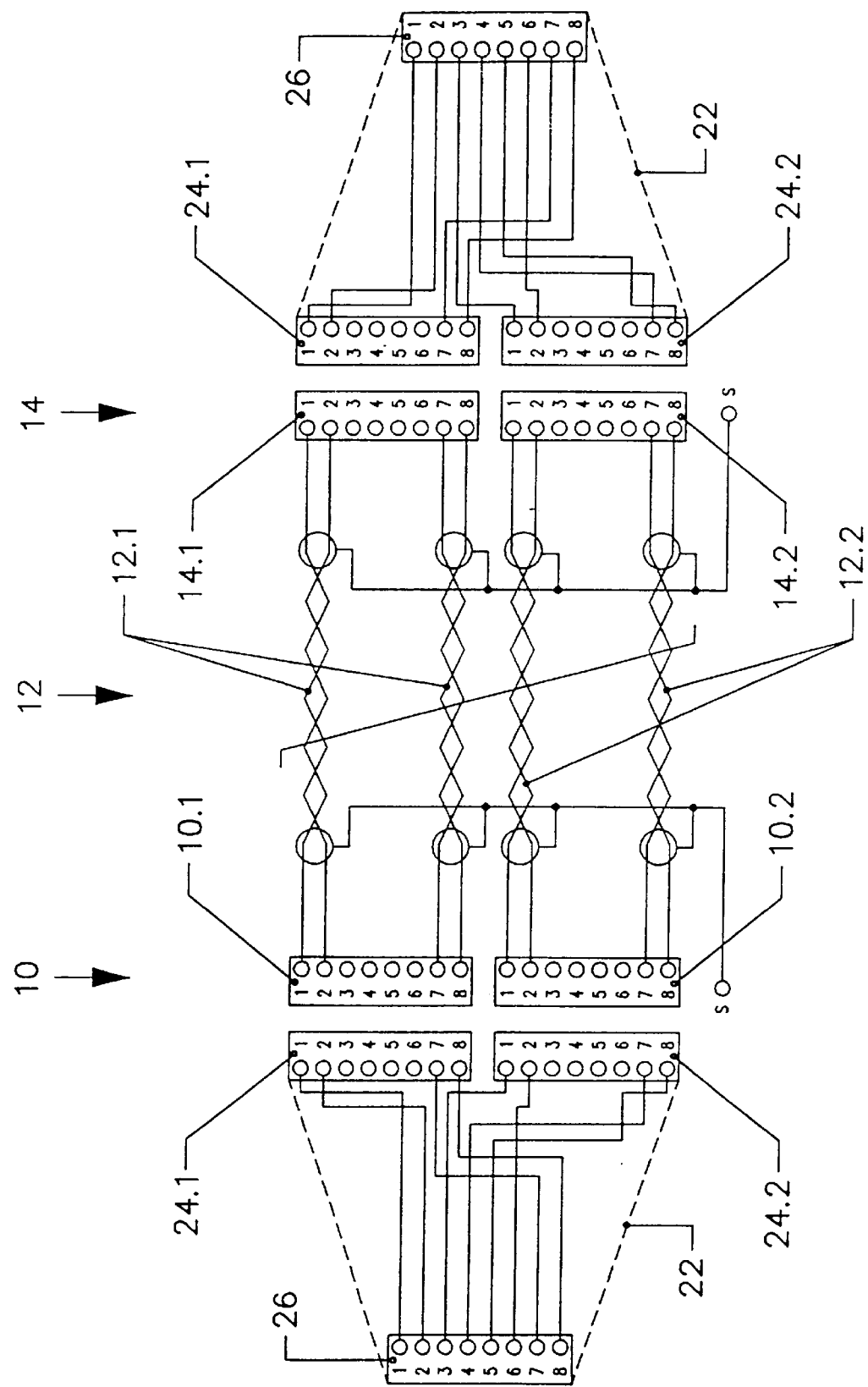
FIG. 2 shows a circuit diagram of a second embodiment.

FIG. 2 shows a second exemplary embodiment of a way in which 4-wire cabling can be converted to 8-wire cabling. Unless otherwise indicated below, this example is the same as the first exemplary embodiment, and to this extent reference is made to the preceding description.

In the exemplary embodiment according to FIG. 2, distribution sockets 10.1 and 10.2 are connected by way of 4-wire cable connections 12.1 and 12.2 to the associated outlets 14.1 and 14.2. The four wires of cable connections 12.1, 12.2 occupy poles 1, 2, 7 and 8 in each case, whereas poles 3, 4, 5 and 6 are unoccupied, To convert the two 4-wire cable connections 12.1 and 12.2 to an 8-wire service, adapters 22 are used on the side of distribution panel 10 and on the side of outlets 14. Adapters 22 have two 8-pole plugs 24.1 and 24.2 which are inserted into distribution sockets 10.1 and 10.2 and into outlets 14.1 and 14.2. In addition, adapters 22 have an 8-pole socket 26. Occupied poles 1, 2, 7 and 8 of one socket 24.1 are connected to poles 1, 2, 7 and 8 of socket 26, whereas poles 1, 2, 7 and 8 of second socket 24.2 are connected to poles 3, 6, 4 and 5 of socket 26. In this way, all 8 poles of socket 26 are connected to the wires of cable connections 12.1 and 12.2.

By insertion of adapters 22 into distribution panel 10 and outlets 14, the 4-wire cabling can be used as an 8-wire cabling by way of sockets 26 of adapters 22. If, in turn, a 4-wire cabling is to be used, the only step necessary is to remove adapters 22.

Plug 24.1 and 24.2 and socket 26 can be contained in a common housing, which surrounds the wiring, so that adapter 22 has an attractive appearance. The use of an adapter 22 of this kind is based on the assumption that sockets 10.1 and 10.2; 14.1 and 14.2 have a defined distance between them, which corresponds to the distance between plugs 24.1 and 24.2 of adapter 22. Thus, it is also possible to design the two plugs 24.1 and 24.2 of adapter 22 as separate units and to connect them to socket 26 of the adapter by flexible connecting cables. In this embodiment, adapter 22 is thus independent of the defined distance between distribution sockets 10.1 and 10.2 and of the defined distance between outlets 14.1 and 14.2.

Even though particular embodiments of the invention have been illustrated and described herein, changes and modification may be made therein within the scope of the following claims.

What is claimed is:

1. In a structured cabling system with at least one pair of 2n-pole distribution sockets, with at least one pair of 2n-pole outlets, and with installed n-wire cable connections, each of which connects n poles of a distribution socket to n poles of the associated outlet, the improvement comprising:

means connecting the n unoccupied poles of one distribution socket (10.1) to the unoccupied poles of the second distribution socket (10.2) for at least one pair of distribution sockets (10.1, 10.2); and means connecting the n unoccupied poles of one outlet (14.1) to the unoccupied poles of the second outlet (14.2) for at least the associated pair of outlets; and in that, in one distribution socket (10.2) and in one outlet (14.2) of each pair, each of the n unoccupied poles can be connected to one of the n occupied poles by means of a short-circuiting bridge plug (16).

2. In a structured cabling system with at least one pair of 2n-pole distribution sockets, with at least one pair of 2n-pole outlets, and with installed n-wire cable connections, each of which connects n poles of a distribution socket (10.1 and 10.2) to n poles of the associated outlet (14.1 and 14.2) the improvement comprising an adapter (22) with appropriate plugs (24.1 and 24.2) for inserting into at least one pair of distribution sockets (10.1 and 10.2) and the associated pair of outlets (14.1 and 14.2) each adapter (22) having an n-pole socket (26); and wherein the adapters (22), the n occupied poles of the two plugs (24.1 and 24.2) are connected in each case to the 2n poles of the socket (26).

3. A cabling system according to claim 1 or claim 2, characterized in that the distribution sockets (10.1 and 10.2) and the outlets (14.1 and 14.2) are 8-pole sockets, and in that the cable connections (12.1 and 12.2) are designed with 4 wires.

4. A cabling system according to claim 3, characterized in that the sockets (10.1, 10.2; 14.1, 14.2) are RJ45 sockets.

5. A cabling system according to claim 2, characterized in that the plugs (24.1, 24.2) and the socket (26) of the adapter (22) are contained together with their wiring in a common housing.

\* \* \* \* \*